United States Patent [19]
Williams et al.

[11] 3,781,099
[45] Dec. 25, 1973

[54] AUTOMATIC OR PRESETTABLE DIAPHRAGM APPARATUS

[75] Inventors: Francis A. Williams, Webster; Harvey H. Dudley, Penfield, both of N.Y.

[73] Assignee: Eastman Kodak Company, Rochester, N.Y.

[22] Filed: Apr. 30, 1973

[21] Appl. No.: 355,621

[52] U.S. Cl. ............. 352/141, 95/10 CD, 95/64 B, 95/64 D
[51] Int. Cl. ...... G03b 7/10, G03b 9/07, G03b 19/18
[58] Field of Search ................ 352/141; 95/10 CD, 95/64 B, 64 D

[56] References Cited
UNITED STATES PATENTS

| | | | |
|---|---|---|---|
| 3,173,350 | 3/1965 | Steisslinger | 95/64 D |
| 3,159,088 | 12/1964 | Bauer | 95/64 D |
| 3,077,153 | 2/1963 | Göpfert | 95/64 D |
| 2,991,704 | 7/1961 | Pickens | 95/64 D |
| 3,044,383 | 7/1962 | Akahane | 352/141 X |
| 3,695,752 | 10/1972 | Nozana | 352/141 |
| 3,664,244 | 5/1972 | Painton | 352/141 |

*Primary Examiner*—Joseph F. Peters
*Attorney*—W. H. J. Kline et al.

[57] ABSTRACT

Diaphragm apparatus for use in a camera for alternatively providing either a continuous variable setting of an exposure aperture to sizes related to received light intensity or a preselectable, fixed exposure aperture size. The apparatus includes diaphragm blades coupled to a self-balancing, light responsive control circuit for establishing the size of the exposure aperture as a function of received light intensity, and switch means which when actuated disable the self-balancing circuit and configures the control circuit to drive the diphragm blades in a direction to form a minimum exposure aperture size. A mode selecting control emement, coupled with a diaphragm stop member, in a first position controls the switch and locates the stop member to permit the control circuit to operate in a mode which establishes an aperture size related to received light intensity, and in at least one other position controls the switch means and locates the aperture stop member so that the apparatus operates in a mode in which the diaphragm blades are driven toward a minimum aperture setting but engage the stop member to establish the preset aperture size.

3 Claims, 5 Drawing Figures

AUTOMATIC OR PRESETTABLE DIAPHRAGM APPARATUS

BACKGROUND OF THE INVENTION

1. Field of the Invention

This invention relates to diaphragm apparatus in a camera and particularly to such apparatus having continuously variable control of an exposure aperture in response to received light intensity and preselectable control to establish a preselected size of the exposure aperture.

2. DESCRIPTION OF THE PRIOR ART

In cine cameras having diaphragm control apparatus which continually adjusts an exposure aperture during exposure in response to variations in received light intensity, it sometimes becomes advantageous to provide for photographing a scene through a fixed aperture which may be selected by a camera operator. For example, a fixed aperture may be desirous when photographing a dark object which is surrounded by light objects whose reflected light would, under light responsive control, reduce the exposure aperture to a size below that which would permit correct exposure of the primary object to be photographed.

Apparatus which may be used to provide light controlled aperture size or preselected aperture size control are known in the art, the most common being a galvanometer-photocell configuration which controls a diaphragm vane. The prior art apparatus most often utilizes a galvanometer, which is coupled to a photosensitive element and to a diaphragm member, for adjusting the size of an exposure aperture in response to received light intensity. The prior art apparatus has utilized a switch which disconnects the galvanometer from the photocell to permit the galvanometer to be manually adjusted, thereby adjusting the exposure aperture size; or the switch, actuated during flash operation of the camera, may disconnect the photocell and connect the galvanometer to a source which drives the diaphragm against a stop to establish a preset aperture size. Such prior art apparatus either requires use of the galvanometer spring as a torque element or have operated in response to focus of the camera in conjunction with insertion of a flash cube into the camera. No prior art discloses apparatus providing for operator selection of a preset or continually variable aperture for exposure in which there is provided a control element for selecting the preset or variable aperture and upon selection of the desired aperture the apparatus drives diaphragm members to form the apertures prior to initiation of exposure.

SUMMARY OF THE INVENTION

Therefore, it is an object of the present invention to provide improved diaphragm apparatus for a camera.

It is another object of the present invention to extend the exposure regulating capability of cameras which continually adjust the size of an exposure aperture in relation to received light intensity.

It is another object of the present invention to utilize a diaphragm control circuit and drive unit of a camera for positioning the diaphragm in response to received light intensity variations or for positioning the diaphragm to a manually preselected position.

These and other objects are attained by the present invention which provides for continuously variable or preselectable fixed positioning of diaphragm means for regulating an exposure aperture size. In accordance with one mode of operation of the present invention, diaphragm means are continuously movable by light responsive drive means for increasing or decreasing the size of the exposure aperture in relation to a decrease or increase in received light. A mode control member is provided to selectively convert the apparatus from the mode of continuous aperture adjustment to a mode providing for a plurality of fixed aperture selections. The control member is coupled with the diaphragm means and includes an aperture stop member which is movable between positions to permit the diaphragm means to continually vary the exposure aperture or stop the diaphragm means at a preset position corresponding to a preset exposure aperture size. During preset aperture control, means are provided for affecting the light responsive drive means to drive the diaphragm means to decrease the size of the aperture until the diaphragm means engages the aperture stop member, thereby establishing a preselected aperture size.

In one illustrative embodiment, the diaphragm means may take the form of two apertured blade members which are coupled for movement to align the apertures to form two apertures of varied size. The light responsive drive means may include a null circuit, a bidirectional drive unit, and photosensitive element which is located to receive light through one of the apertures. The control member, upon movement, sets the aperture setting member to a preselected position and configures the null circuit to drive the blades toward a position to form a minimum aperture size.

BRIEF DESCRIPTION OF THE DRAWINGS

The invention and its objects and advantages become more apparent in the detailed description of the preferred embodiment presented below in conjunction with the accompanying drawings in which.

DETAILED DESCRIPTION OF THE DRAWINGS

Because photographic cameras are well known, the present description will be directed in particular to elements forming part of or cooperating more directly with the present invention, camera elements not specifically shown or described herein being understood to be selectable of those known in the art.

Figure 1:
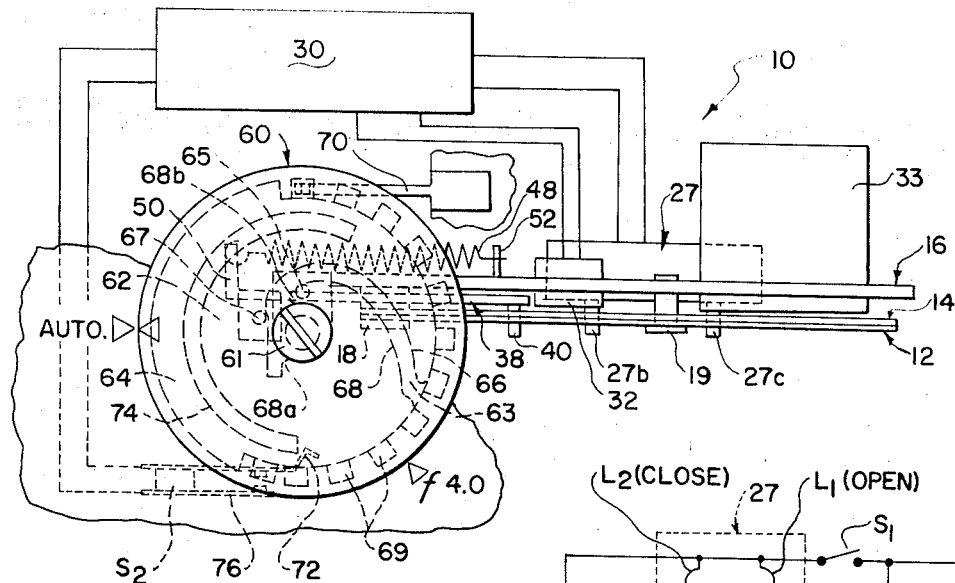
FIG. 1 is a plan view of diaphragm apparatus of a preferred embodiment of the present invention which includes a mode control member shown in a position which permits the diaphragm apparatus to continually adjust an exposure aperture in response to received light variations.
Figure 2:
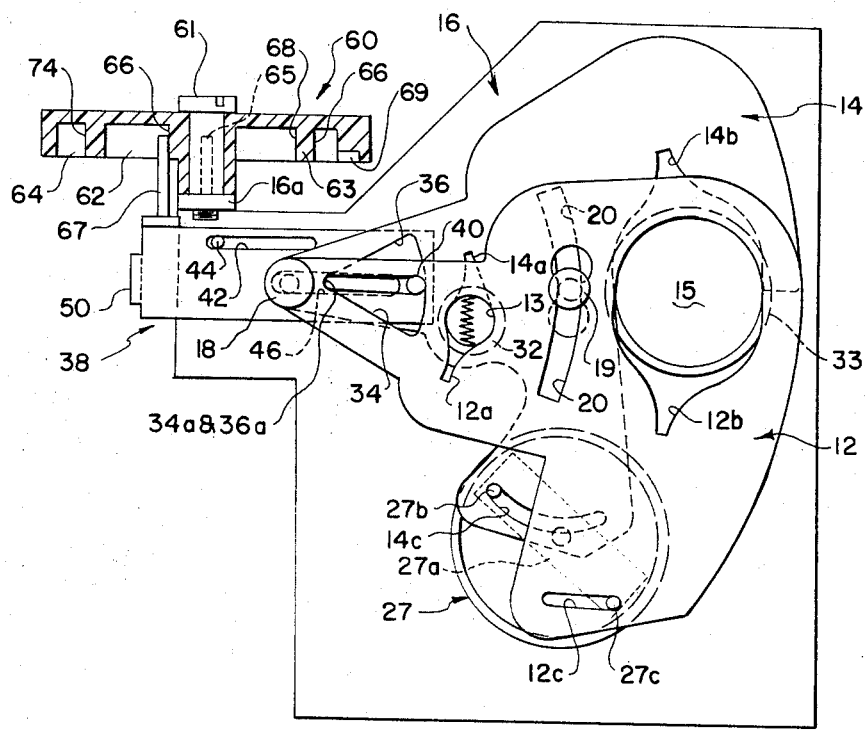
FIG. 2 is a front view of the apparatus of FIG. 1 showing one position of diaphragm blades during continual aperture adjustment operation in which a full open aperture is formed.

Referring first to FIGS. 1 and 2, apparatus in accordance with a preferred embodiment of the invention is shown in which diaphragm apparatus 10 includes aperture defining blades 12 and 14, each being of planar, opaque material and being mounted to a common point on a mounting plate 16 by means of a mounting post 18. The blade 12 contains selectively configured apertures 12a and 12b such as a "teardrop" aperture which is located in a reverse overlapping relationship with similarly configured apertures 14a and 14b of the blade 14. Photocell aperture 13 and lens aperture 15 are formed as the blades 12, 14 pivot about the mounting post 18 to move the aperture 12a relative to the aperture 14a, and the aperture 12b relative to the aperture 14b. The blades 12, 14 are guided in the pivotal movement by a guide pin 19 received in slots 20 of the blades 12, 14.

The blades 12, 14 are pivoted in oppositely opposed directions about the post 18 by means of a bidirectional drive unit 27. The drive unit 27 includes a movable magnet 27a having pins 27b and 27c which are received in selectively curved slots 12c and 14c in the blades 12, 14 respectively in a manner such that movement of the element 27a in a clockwise direction will move the blades 12, 14 in a clockwise and counterclockwise direction respectively, and visa versa. The drive unit 27 may be a moving magnet instrument or moving coil instrument, both of which include at least two coils which are oppositely wound in the instrument and coupled in a suitable electronic control circuit 30 to provide a "self-balancing" capability. A moving magnet instrument is preferable to a moving coil instrument because bearing friction error in moving magnet instruments is considerably below that of moving coil instruments.

Figure 3:
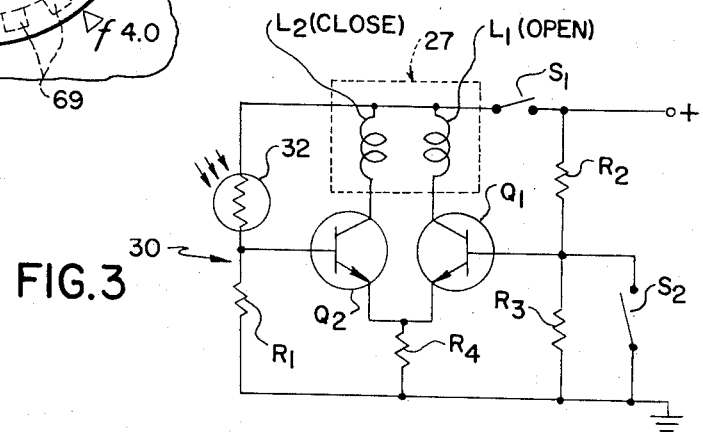
FIG. 3 is a circuit diagram of a differential circuit which is suitable for use with the apparatus of FIGS. 1 and 2.

The electronic circuit 30 may be for example a differential circuit, a simplified form of which is shown in FIG. 3, which includes the two drive coils of $L_1$ and $L_2$ of the drive unit 27, coupled in different portions of the differential circuit. On coil $L_1$, which may be called an "open" coil is coupled in the collector circuit of a transistor $Q_1$ of the differential circuit such that when current flow in the coil $L_1$ exceeds the current flowing in the other coil $L_2$, which may be coupled in the collector circuit of a transistor $Q_2$ of the differential circuit and called a "close" coil, the magnet 27a rotates to open the apertures 13, 15, and visa versa. Another form of differential circuit which is suitable for use with the apparatus is disclosed in U.S. Pat. NO. 3,651,324 to Daniel E. carter et al. A photosensitive element 32, which may have a resistance that varies inversely as the intensity of received light varies is coupled in the electronic circuit 30 to the base element of the transistor $Q_2$ and is located to receive light through the aperture 13. Variations in the size of the aperture 13 result in variations in the amount of light impinging onto the photosensitive element 32, and thus results in variation of its resistance. The photosensitive element 32 is series coupled to a resitor $R_1$, the junction of which is coupled to one input of the differential circuit at the base of transistor $Q_2$ so that as the resistance of the photosensitive element 32 varies, the bias to the transistor $Q_2$ varies, and thus varies the current flow in the drive coils $L_1$ and $L_2$ (increases in one and decreases in the other), which varies the aperture 13 and results in a balancing or "null" effect in current flow in the coils. The differential circuit also includes suitable bias resistors $R_2$, $R_3$ and $R_4$, a switch $S_1$ which is energized by a camera release member (not shown) and a switch $S_2$ to be discussed later. For purposes of perspective, a lens barrel 33 is shown in alignment with the aperture 15.

In accordance with the invention, the blades 12, 14 include dihedrals 34 and 36 which are located in the blades 12, 14 respectively and with respect to each other to become aligned or overlapping as the blades 12, 14 pivot, and which have their respective dihedral angles 34a and 36a located adjacent to the mounting post 18. A slidable bar 38 carries an aperture stop pin 40 which is received within the overlapping dihedrals 34, 36. The slidable bar 38 is laterally movable along the plate 16, being positioned by a guide slot 42 within which a guide pin 44 is received, and a mounting slot 46 within which the mounting post 18 is received. The slidable bar 38 is laterally movable against the tension of a spring 48 which has one end attached to one end 50 of the slidable bar 38 and the other end attached to a pin 52 on the mounting plate 16, thereby urging the slidable bar 38 towards the position shown in FIG. 1.

A control knob 60, which may be circular in shape is rotatably mounted to a flange 16a (see FIG. 2) of the mounting plate 16 by means of a screw 61, is provided with relief sections 62 and 64 in the under side thereof. As may best be seen by reference to FIG. 1 in conjunction with FIG. 2, the relief sections 62, 64 form a ridge 63 having an outer cam surface 66 against which a cam runner 67 is positioned. The cam runner 67 may be a pin coupled with a slidable bar 38, and positioned to project upward into the relief 62 and which will move along the cam surface 66 as the control knob 60 is rotated, thus moving the slidable bar 38 laterally relative to the mounting plate 16. The tension of the spring 48 retains the cam runner 67 against the cam surface 66. The rotational travel of the control knob 60 will not reach a full 360° due to a pin 65, located on the mounting plate 16 and being positioned to engage an inner cam surface 68 of the ridge 63 when the control knob 60 is rotated clockwise, and to engage a notch 68a, formed by the inner cam surface 68, when the control knob is rotated counterclockwise. The pin 65 engages the inner cam surface 68 at a pocket 68b to stop the control knob 60 corresponding to "automatic" operation when the control knob 60 is rotated fully clockwise and the notch 68a engages the pin 65 at a minimum setting of the aperture 15 when the control knob 60 is rotated fully counterclockwise. "Automatic" operation refers to the mode in which the apparatus continually adjusts the aperture 15 as received light varies. The relief 64 is essentially circular in shape and includes notches 69 periferal to the control knob 60. A detent 70, which may be a leaf spring, is positioned to engage successive notches 69 as the control knob 60 is rotated, thereby locking or detenting the control knob 60 at preselected positions in its movement. Each notch 69 corresponds to a preset valve (size) of the aperture 15. The switch $S_2$, which is connected to the control circuit 30 may include a contact 72 located adjacent a cam surface 74 formed by the relief 64. When the control knob 60 is rotated counterclockwise, surface 74 engages the contact 72 and moves the contact 72 against its companion contact 76 thereby closing switch $S_2$. The apparatus is thus in a mode of operation in which a preset exposure aperture is formed.

Reference is also made to FIGS. 1 and 2 for a description of the operation of the apparatus in an "automatic" mode of operation. In FIG. 1 the control knob 60 is shown positioned in the "automatic" position. In the position of the apparatus shown in FIG. 1, the switch $S_2$ is open and the cam runner 67 is positioned along the cam surface 66 in a position which permits the spring 48 to locate the slidable bar 38 to be at a point furtherest to the right, thus positioning the aperture stop pin 40 at a position within the dihedrals 34, 36 which permits the blades 12, 14 to move through their full range of movement without engaging the aperture stop pin 40 (see FIG. 2). When the switch $S_1$ is closed, the resistance of the photosensitive element 32 changes as the received light intensity varies thus conditioning the circuit 30 to drive the drive unit 27 to reduce or increase the aperture 13 until the resistance of the photosensitive element 32 produces a null in the drive coils. In this manner an aperture 15 is formed which is of size related to received light intensity. Any further changes in light incident on the photosensitive element 32 will result in a continual, slight increase or decrease in the aperture 13 formed over the photosensitive element 32 and thus a slight increase or decrease in the size of the aperture 15. For example during panning of a camera, objects are encountered which have varying reflected light intensity and result in a movement of the blades 12, 14 in a slightly oscillatory fashion toward open or closed positions of the aperture 15.

Figure 4:
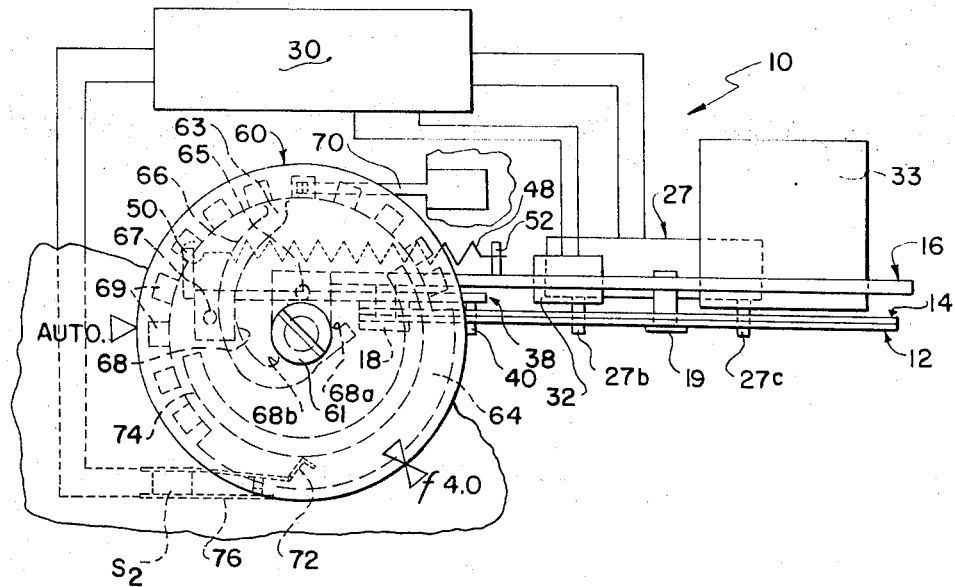
FIG. 4 is a plan view of the apparatus of FIG. 1 with the mode control member set to establish a reset aperture value.
Figure 5:
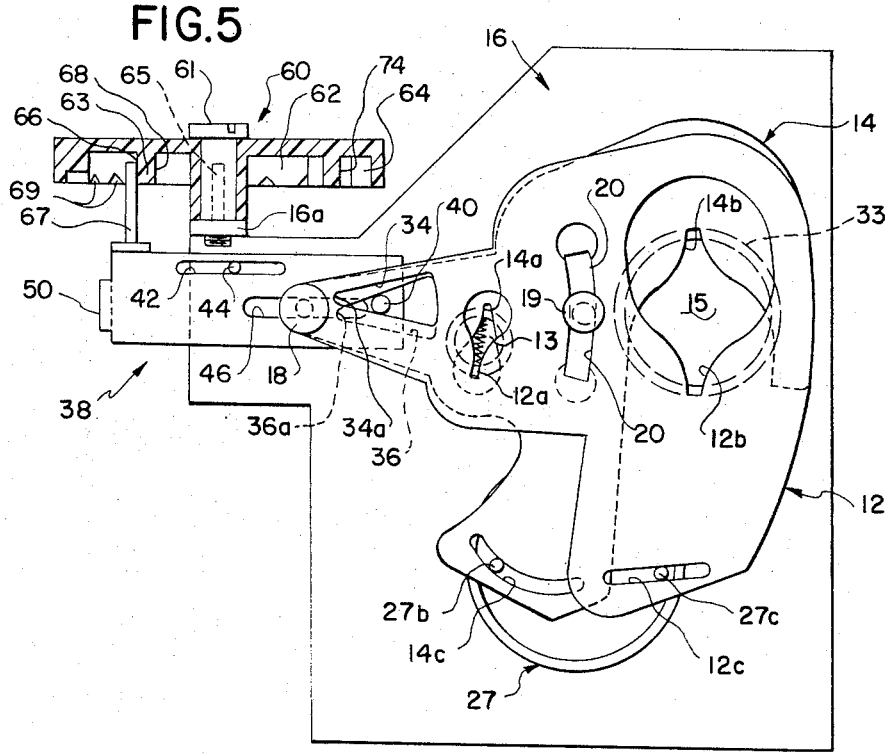
FIG. 5 is a front view of the apparatus of FIG. 3 showing the positioning of the diaphragm blades in accordance with the preselected aperture value.

Reference is made to FIGS. 4 and 5 which show the operation of the apparatus during a "preset aperture" mode of operation. During preset aperture operation the control knob 60 is rotated to a position which corresponds to a desired size (f/no.) of the aperture 15. In the example shown in FIG. 4 a size corresponding to $f/4.0$ is shown. Clockwise rotation of the control knob 60 produces a movement of the cam runner 67 along the cam surface thereby forcing the slidable bar 38 to the left against the tension of the spring 48. The detent 70 engages successive notches 69 until a notch 69 which corresponds to f/4.0 is reached. The detent 70 detents the control knob 60 in the f/4.0 position against the force of the spring 48. As a result of the movement of the slidable bar 38 to the left, the aperture stop pin 40 moves into a position between the dihedrals 34, 36. Initial counterclockwise movement of the control knob 60 also closes switch contacts 72, 76 via cam surface 74, which grounds the base of the transistor $Q_1$ and simulates a very high light condition. Grounding the base of transistor $Q_1$ conditions the differential circuit to provide full current in the drive coil $L_2$ to drive the blades 12, 14 toward a minimum size of the aperture 15. As the dihedrals 34, 36 overlap, the blades 12, 14 engage the aperture stop pin at a position corresponding to $f/4.0$. The drive unit 27 continues to drive the blades 12, 14 toward the minimum aperture setting thereby retaining the blades 12, 14 at the desired position during exposure. The aperture 15 is thus reduced to a setting of $f/4.0$.

In the event that, because of ambient light conditions, the aperture 15 is at a size smaller than $f/4.0$ (for example $f/16$) when the preset aperture mode at aperture 15 setting of $f/4.0$ is selected, the aperture stop pin 40 will engage the edges of the dihedral cutouts 34, 36 as the slidable bar 38 moves to the left, thereby forcing the blades 12, 14 to increase the size of the aperture 15, against the drive of the drive unit 27.

The invention is described in detail with particular reference to a preferred embodiment thereof, but it will be understood that variations and modifications can be effected within the spirit and scope of the invention.

We claim:

1. In a camera, diaphragm apparatus comprising:

diaphragm means movable for forming an exposure aperture;

light responsive drive means coupled with said diaphragm means for varying said diaphragm means for forming said aperture to a size related to received light intensity;

stop means movable in relation to said diaphragm means between an inactive position and an active position for stopping said diaphragm means at a position which corresponds to a preselected exposure aperture size;

activatable switch means for actuating said light responsive drive means to drive said diaphragm means to form an aperture of minimum size; and a control element, operatively associated with said stop means and said actuating means, and being movable for moving said stop means between its inactive position and its active position and for activating said actuating means while said stop means is in its active position.

2. In a camera, diaphragm apparatus comprising:

diaphragm means movable for forming an aperture of varied size;

drive means, coupled to said diaphragm means, for moving said diaphragm means to vary said aperture between a maximum and minimum size;

control circuit means, including photosensitive means disposed to receive light, for providing a signal to said drive means to vary said aperture size in relation to received light conditions;

first switch means for activating said control circuit means;

stop means, displaceable relative to said diaphragm means, for engaging said diaphragm means at preselected positions in the movement of said diaphragm means for forming an aperture of preselected size;

second switch means, connected in said control circuit means and being actuatable for activating said circuit means to drive said drive means to move said diaphragm means toward said minimum aperture size; and control means, coupled to said stop means and being located relative to said second switch means, for positioning said stop means in a position to permit said diaphragm means to be moved to form an aperture of size related to received light intensity, and being movable to at least one position in which said control means actuates said second switch means and positions said stop means to engage said diaphragm means to form an aperture of preselected size.

3. In a camera, diaphragm apparatus comprising:

first and second apertured blade means, located and movable relative to each other to align said apertures, for forming first and second apertures of varied size;

drive means, coupled to said blade means and being movable in first and second directions, for moving said blade means to vary said aperture size between a maximum and minimum size;

control circuit means, coupled to said drive means and including a photosensitive element disposed to receive light through said first aperture, for providing a signal to said drive means for positioning said blade means between said maximum and minimum size to form an aperture of size related to received light intensity;

first switch means for activating said control circuit means;

stop means, displaceable along an axis relative to said first and second blades, for engaging said blades at preselected positions during movement thereof to form apertures of preselected size;

second switch means, connected in said control circuit means and being actuatable, for activating said control circuit means to provide a signal to cause said drive means to drive said blades means in a direction to form a minimum aperture size; and control means, coupled to said stop means and located in a first position relative to said second switch means positioning said displaceable member to permit said apparatus to provide an aperture of size related to received light intensity, and being movable to at least one position for actuating said second switch means and for positioning said stop means to be engaged by said blades during movement of said blades to form said preselected aperture size.

* * * * *